(12) United States Patent
Holm et al.

(10) Patent No.: US 6,223,039 B1
(45) Date of Patent: Apr. 24, 2001

(54) SIMPLIFIED ACQUISITION OF ESN

(75) Inventors: Anders T. Holm; David P. Larson; Mats V. Hoglund, all of Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/318,095

(22) Filed: May 25, 1999

(51) Int. Cl.$^7$ .................................................. H04Q 7/20
(52) U.S. Cl. .......................... 455/435; 455/433; 455/426; 455/552
(58) Field of Search .................................. 455/410, 411, 455/426, 433, 435, 432, 461, 462, 465, 552, 553, 554, 555, 420, 419, 418

(56) References Cited

U.S. PATENT DOCUMENTS

| | | | |
|---|---|---|---|
| 5,506,887 | * 4/1996 | Emery et al. | 455/433 |
| 5,537,610 | * 7/1996 | Mauger et al. | 455/433 |
| 5,670,950 | 9/1997 | Otsuka . | |
| 6,073,029 | * 6/2000 | Smith et al. | 455/461 |

FOREIGN PATENT DOCUMENTS

| | | |
|---|---|---|
| 0820207A2 | of 1997 | (EP) . |
| WO95/24106 | of 1995 | (WO) . |
| WO 98/30050 | of 1998 | (WO) . |

\* cited by examiner

*Primary Examiner*—Marsha Banks-Harold
(74) *Attorney, Agent, or Firm*—Coats & Bennett, PLLC

(57) ABSTRACT

The MIN, but not the ESN, associated with a mobile station is entered into a permanent subscriber record associated with a private wireless communications system. During at least the initial registration attempt for the mobile station in the private system, the mobile station sends its MIN and ESN to the private system. The private system then asks a public wireless communications system for verification of the subscription status of the mobile station. If the status is favorable, e.g., the mobile station has a valid subscription to the public system, the private system updates its permanent subscriber record to include the ESN and continues with the registration process. If the verification response indicates an unfavorable subscription status, e.g., the ESN/MIN combination is invalid, the private system preferably refuses to allow the mobile station to register. By using this method, the ESN is not entered into the subscriber record until the mobile station attempts to register with the private system and the information passes a verification test involving the public system. This means that the initial setting up of the subscriber record, which is done manually, need not include a time consuming step. Instead, the ESN is automatically supplied from the mobile station, thereby reducing the burden on the private system service provider and increasing accuracy. This method is particularly adapted for use in Digital Wireless Office Systems.

22 Claims, 2 Drawing Sheets

SIMPLIFIED ACQUISITION OF ESN

FIELD OF THE INVENTION

This invention relates to the establishment of subscriber profiles in a mobile wireless communications system, and particularly to a simplified method of acquiring the Electronic Serial Number (ESN) associated with a mobile station newly subscribing to a private wireless communications system.

BACKGROUND OF THE INVENTION

Wireless communications may be roughly divided into public systems and private systems. Public systems are integrated portions of the Public Land Mobile Network (PLMN) and must accept any paying customer. Such public systems are typically very large and complex. In the United States, the public systems operate according to well known communications standards, such as ANSI/TIA/EIA-136, GSM, or the like. In contrast, private systems do not need to accept any customer willing to pay, but may instead limit membership, such as to employees of a corporation. These private systems are typically small and less complex than public systems.

Typically, in public wireless communications systems mobile stations are identified by Mobile Identification Numbers (MIN), Mobile Directory Numbers (MDN), and Electronic Serial Numbers (ESN). The MDN may be thought of as the "phone number" of the mobile station. The MIN represents the identification of the particular mobile station to the wireless communications system and may be thought of as the "logical unit identity" of the mobile station within the public wireless communications system. The ESN is a physical identity indicator, such as serial number unique to the physical mobile station, and plays an important part in anti-cloning efforts. The details of the use and function of these identifications are well known in the art.

Typically, when a user establishes a subscription account in a public wireless communications system, the MIN and ESN are entered into a database within the public wireless communications system and the corresponding MDN is assigned. In addition, various pieces of subscriber billing information and the like are entered. It is common for the mobile station's ESN and MIN to uniquely identify the mobile station for the various public wireless communications systems that together form a Public Land Mobile Network (PLMN). For security reasons, the sensitive information of the MIN and the ESN should be known to as few people as possible.

It is common to allow mobile stations to roam into other geographic areas and still continue to operate. In order to facilitate roaming, it is common to use Home Location Registers (HLR) and Visitor Location Registers (VLR) in a manner well known in the art.

In recent years, there has been much interest in building private wireless office telephone systems (WOTS) by corporations or other large entities. Private wireless office telephone systems employ many concepts and features used by public wireless communications systems and may be thought of as a scaled down versions thereof. As with public wireless communications system, a private wireless communications system, such as a WOTS, must be able to properly identify the mobile stations that are entitled to its services. In addition, the private wireless communications system should be able to interface with the public wireless communications system, so as to be able to originate, terminate, hand-off calls, and the like.

The main advantage of a WOTS is that it allows people to use wireless telephones in an office or other localized area rather than a desk phone with a fixed connection to the telephone system. This allows people to have mobility within the office, yet remain accessible by phone. In order to realize fully the potential of the wireless office telephone system, it is desirable to also interface the WOTS with public systems. Interfacing with the public systems allows subscribers of the WOTS to use a single mobile station in both systems. That is, a subscriber of a private wireless telephone system could use the same mobile station when "roaming" in the public system.

Both public and private wireless communications systems maintain permanent subscriber profiles, typically indicating which services the subscriber is entitled to, the identity of the individual user, billing information, and the like. This information is permanent in the sense that the subscriber profile is intended to be maintained for as long as the mobile station is subscribed to the particular wireless communications system, not just for as long as the mobile station is registered with that system. The information may of course be updated during its lifetime.

Under the prior art, the creation of a subscriber profile in a private wireless communications system requires manual entry of at least the MIN and the ESN. However, as discussed above, the fewer people who know a mobile station's MIN and ESN, the better. Thus to eliminate even one person who knows those numbers is advantageous. More importantly, the manual entry of MINs and ESNs is a time consuming task that is prone to error during manual entry. This is particularly true for businesses that are just setting up a new private wireless communications system that will use existing mobile stations currently subscribed to a public wireless communications system.

SUMMARY OF THE INVENTION

The present invention allows for an automated entry of the ESN information into the private wireless communications system ("private system"). The mobile station, or wireless communications device, preferably first subscribes to a public wireless communications system ("public system"). As part of this process, at least the MIN, and preferably the ESN, corresponding to that wireless communications device are entered into the public wireless communications system. Thereafter, the MIN, but not the ESN, is entered into a permanent subscriber record associated with the private system. During at least the initial registration attempt for the mobile station in the private system, the mobile station sends its MIN and ESN to the private system. The private system then sends a verification inquiry to the public system. This verification inquiry may take a variety of forms, but includes at least the MIN, and preferably the ESN, sent by the mobile station. The public system then looks to its records and determines the subscription status of the mobile station indicated by the MIN. This status is communicated to the private system. If the status is favorable, e.g., the mobile station has a valid subscription to the public system, the private system updates its subscriber record to include the ESN and preferably continues with the registration process. If the verification response indicates an unfavorable subscription status, e.g., the ESN/MIN combination is invalid, the private system preferably refuses to allow the mobile station to register. In some optional embodiments, the ESN is subjected to the verification test, and the private system subscriber record is additionally updated, each time the mobile station attempts to register with the private system.

By using this method, the ESN is not entered into the subscriber record until the mobile station attempts to register with the private system and the information passes a verification test involving the public system. This means that the initial setting up of the subscriber record, which is done manually, need not include a time consuming and error prone step. Instead, the ESN is automatically supplied from the mobile station, thereby reducing the burden on the private system service provider and increasing accuracy.

DETAILED DESCRIPTION

Figure 1:
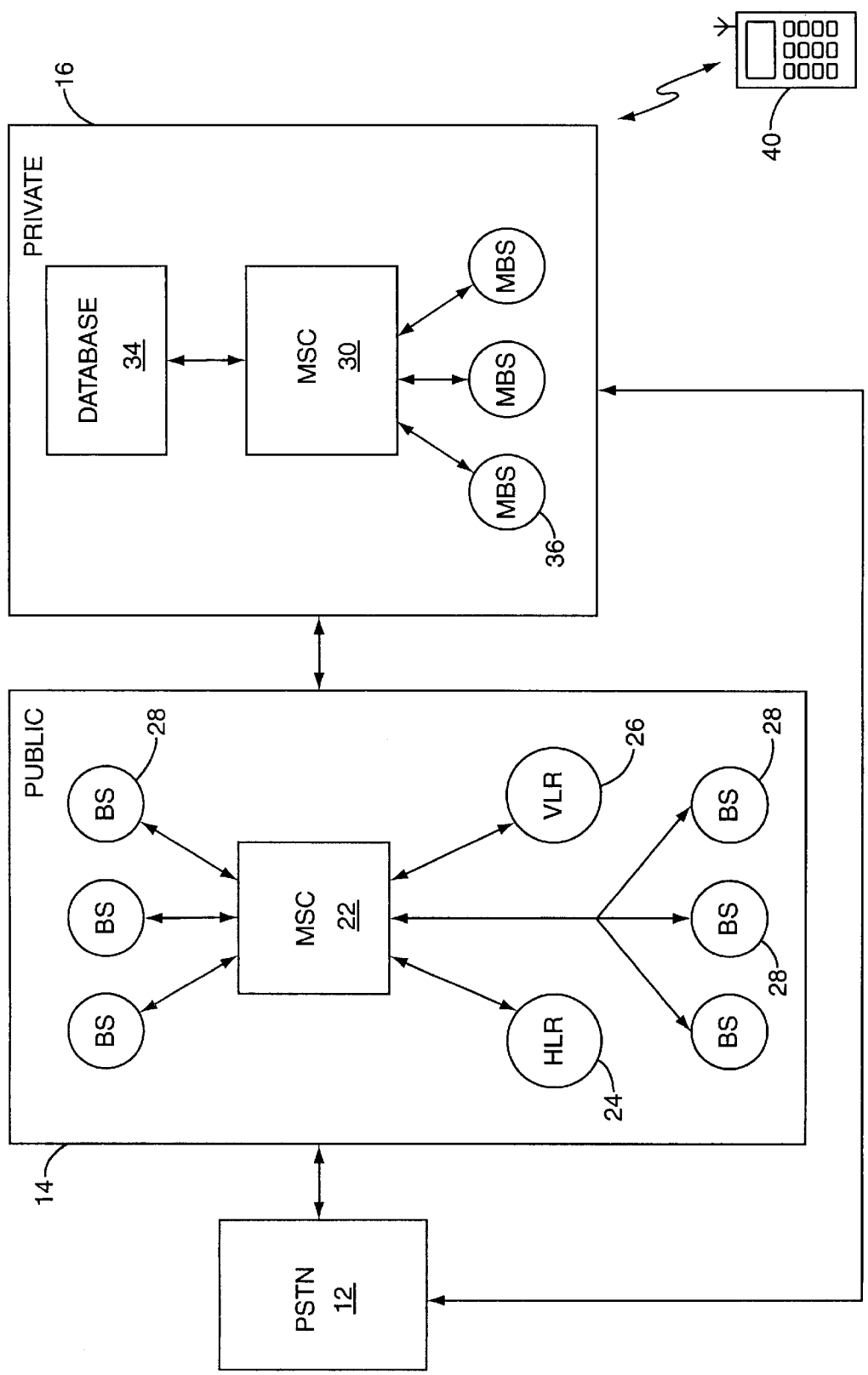
FIG. 1 shows a private wireless communications system connecting to a public wireless communications system and the PSTN.

Turning now to the drawings, FIG. 1 shows a public wireless communications system 14 interconnected to a Public Switched Telephone Network (PSTN) 12 and a private wireless communications system 16 and communicating with one or more mobile stations 40. While there may be multiple public wireless communications systems 14 and private wireless communications systems 16, one of each is shown for simplicity. For this illustrative example, the public wireless communications system 14 will be assumed to be a portion of the Public Land Mobile Network (PLMN) and the private wireless communications system 16 will be assumed to be a private wireless office telephone systems (WOTS), such as a system known as Digital Wireless Office System (DWOS). Further, it should be noted that the term mobile station 40, as used herein includes, but is not limited to, cellular phones, pagers, personal digital assistants, and the like.

Public wireless communications system 14 typically include at least one Mobile Services Switching Center (MSC) 22, Home Location Register (HLR) 24, a Visitor Location Register (VLR) 26, and a plurality of base stations 28. Typically, base stations 28 communicate with MSCs 22 and the MSCs 22 communicate between themselves, and with the PSTN 12, as needed or required by the demands of the subscribers. The public system 14 operates according to one of a plurality of communications protocols. One such communication protocol popular in the United States is ANSI/TIA/EIA-136 (ANSI-136), which is incorporated herein by reference.

When a call is placed by a mobile station 40, to a number in the PSTN 12, the MSC 22 connects the call to the PSTN 12. When a call to a mobile station 40 is received by an MSC 22, the MSC 22 must be able to connect the call to the mobile station 40 addressed by the call. In order to connect calls to a mobile station 40, the MSC 22 must know the location of the mobile station 40 so that calls can be forwarded to the appropriate MSC 22 for routing to the mobile station 40. Information concerning the whereabouts of each mobile station 40 is typically stored in the databases known as the HLR 24 and the VLR 26. Typically, the HLR 24 of the public system maintains a subscription record of a mobile station 40, including at least the mobile station's ESN and MIN, which uniquely identify the mobile station 40 for the public system 14. In contrast, the VLR 34 has no such record until the mobile station 40 registers with the MSC 22 connected to that VLR 34, and then only while the mobile station 40 is roaming into the territory of this particular public system 14.

The mobile station 40 registers with the servicing MSC 22 when it is powered on, and preferably at periodic intervals, so that the servicing MSC 22 can keep track of the location of the mobile station 40. The mobile station 40 also registers when it travels between two different service areas. As part of this registration procedure, the mobile station 40 transmits its Mobile Identification Number (MIN) and its Electronic Serial Number (ESN) to the MSC 22. The MSC 22 verifies that the MIN/ESN combination does in fact belong to a valid subscriber by referencing the appropriate HLR 24. In addition, it is customary for the servicing MSC 22 to update the HLR 24 of the subscriber's home system with the location of the mobile station 40 when the mobile station 40 registers with the MSC 22. When an MSC 22 receives a call addressed to a subscriber that is not currently in that MSC's service area, the MSC 22 will query the HLR 24 for the subscriber's location so that the call can be forwarded to the MSC 22 currently servicing the subscriber.

Additional details of the operation of the public system 14 are known by those of skill in the art, and further discussion thereof is not required for understanding of the present invention.

The private system 16 typically includes a single MSC 30 and a plurality of micro-basestations 36. In addition, the private system 16 also includes at least one database 34 which, in addition to other functions, performs functions similar to that of the HLR 24, and preferably the VLR 26 of the public system 14. As with the public system 14, the details of the operation of the private system 16 are known by those of skill in the art, and further discussion thereof is not required for understanding of the present invention. For purposes of illustration, it is sufficient to understand that the entities within the public system 14, such as database 34 and other such components, interact with the private system 16 entities as if the private system 16 entities were part of the public system 14.

In its database 34, the private system 16 maintains subscriber profiles for each mobile station belonging to that system. That is, in general, the subscriber needs to have had a subscriber profile record created in the private system 16 in order to be recognized by private system 16. While the subscriber profile may contain various types of information, the prior art subscriber profiles include at least the ESN and MIN of the corresponding mobile station. In the prior art, this information was manually entered during the process of creating the initial subscriber profile. The present invention relates to a more efficient method of securing that information for the private system 16.

Figure 2:
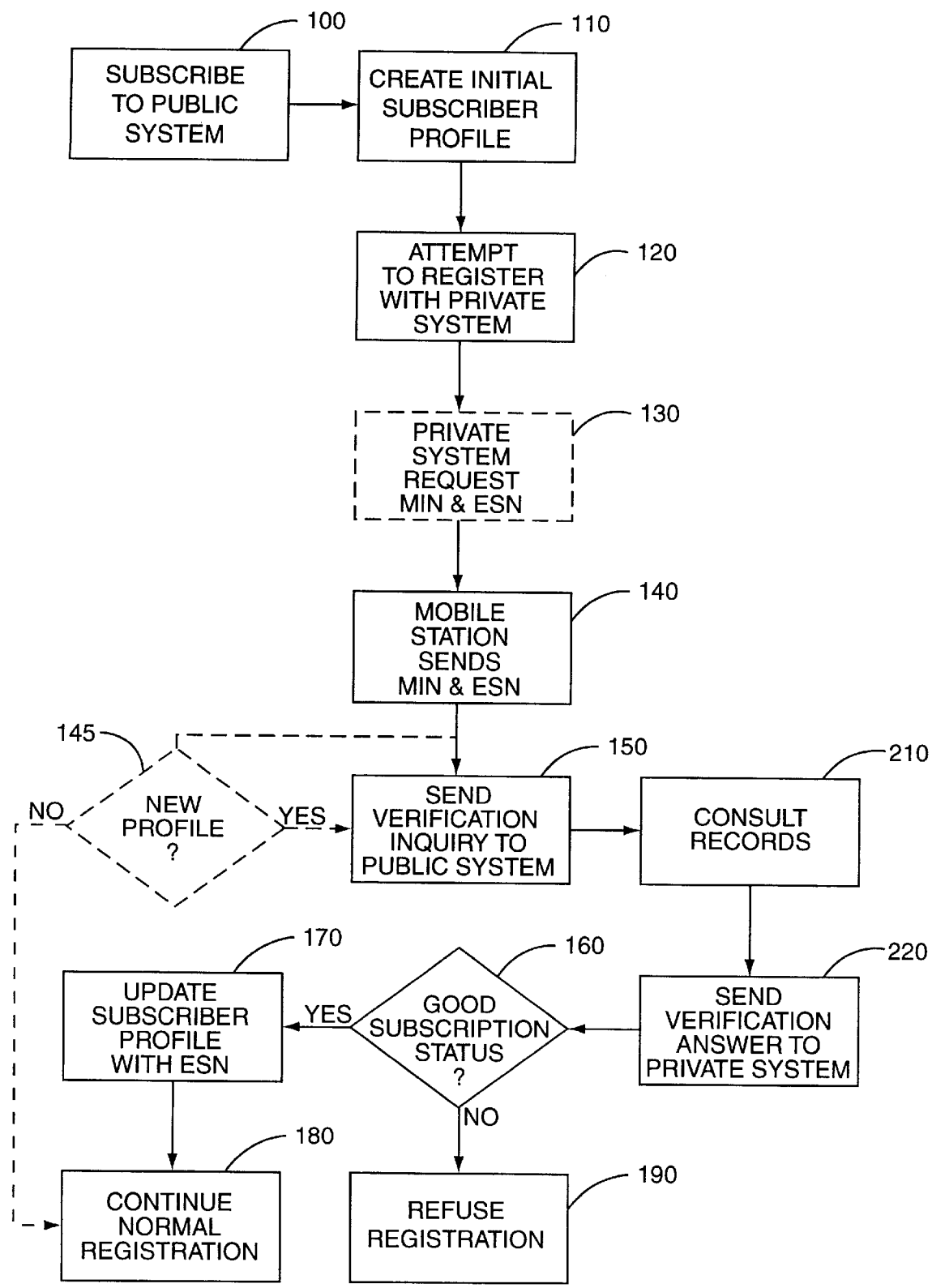
FIG. 2 is a simplified flow diagram of the private wireless communications system activity relating to the automatic acquisition of ESN.

Referring to FIG. 2, before the process of the present invention begins, the user preferably subscribes to a public wireless communications system 14 (box 100). It should be noted that this may occur before the ESN acquisition process begins, or may occur any time before the mobile station 40 attempts to register with the private wireless communications system 16 (box 120).

The ESN acquisition procedure begins with the creation of a new subscriber profile in the database 34 of the private system 16 (box 110). During this step, the Mobile Directory Number (MDN) and other non-security sensitive information such as name, billing address, services allowed and so forth are entered into the private system 16. In addition, the Mobile Identification Number (MIN) is entered. At some point, manual entry of data ends, and an initial subscriber profile is created in the database 34. In contrast to the prior art, the Electronic Security Number (ESN) is not supplied to the private system 16 at this point.

Later, the mobile station 40 initiates a registration attempt with the private system 16 (box 120), in this case for the first time. Preferably, the private wireless communications system 16 responds as is known in the art, but also specifically requests (or instructs) the mobile station 40 to send its MIN and ESN (box 130). The mobile station 40 then sends its MIN and ESN to the private system 16 (box 140). The communications between the mobile station 40 and the private system 16, during at least this phase of the registration procedure, are preferably according to the same protocols as used by the public system 14 to register mobile stations 40. For instance, the ANSI-136 registration communications protocols may be used.

As a continuing portion of the ESN acquisition procedure, the private system 16 then sends a verification inquiry to the public system 14 (box 150). The purpose of this verification inquiry is to determine the subscription status of the mobile station 40. That is, whether or not the mobile station 40 has a valid subscription to a public system 14. In response to the verification inquiry, the public system 14 checks it records, such as by searching its HLR 24 (box 210), and reports a verification answer back to the private system 16 (box 220). This verification answer may be favorable, indicating that the mobile station 40 has a valid subscription to the public system 14, or the verification answer may be unfavorable, indicating that the mobile station 40 does not have a valid subscription to the public system 14. Of course, the public system 14 may also report back other information to the private system 16, such as indications of what services the mobile station 40 is entitled to and may also update the location the mobile station 40 in its HLR 24, as appropriate.

It should be noted that the verification inquiry will typically include the MIN and ESN supplied by the mobile station 40 to the private system 16. It is anticipated that the public system 14 will use both the MIN and ESN to verify the subscription status, but this is not required. Indeed, some public systems 14 are believed to use only the MIN, or the MIN in combination with other information, to verify subscription status. The particular approach used is unimportant; the public system 14 need only return a suitable verification answer using any known method.

The communications between the public system 14 and the private system 16 may be using any known technique. For instance, the public system 14 and the private system 16 may communicate using ANSI-41 over SS7, as is well known in the art. These specifications are incorporated herein by reference. In such an arrangement, the private system 16 would likely appear as simply another node on the SS7 network. Of course, other communications arrangements may be used between the public system 14 and the private system 16, the particular details being unimportant to the present invention.

If the private system 16 receives a verification answer indicating a favorable subscription status (box 160), the private system 16 responds by updating the subscriber profile in the database 34 to include the supplied ESN (box 170) and then continues with the remainder of the registration procedure as is conventional (box 180). If the private system 16 receives a verification answer indicating an unfavorable subscription status (box 160), the private system 16 does not update the subscriber profile to include the supplied ESN and preferably also responds by not allowing the mobile station 40 to register with the private system 16 (box 190).

In some embodiments, this verification of subscription status may occur every time the mobile station 40 attempts to register with the private system 16, with a resulting overwrite of the ESN data in the subscriber profile. However, in one preferred embodiment, the registration procedure avoids overwriting the ESN in the subscriber profile after successful entry of the ESN with the first registration. Thus, optional box 145 shows the step where the private system 16 asks itself whether or not this is a new subscriber profile. If the answer is no, then registration is completed as normal (box 180). If the answer is yes, indicating a new profile, the private system 16 performs the subscription verification as described above (box 150 et. seq.).

The use of the present method allows the ESN of mobile stations 40 to be automatically acquired, rather than manually input. Thus, the accuracy of the subscriber profile data is improved and the burden of entering the data is reduced.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. In a wireless communications network having a public wireless communications system including a first database and a private wireless communications system including a second database, a method for the private wireless communications system to automatically obtain the physical identity indicator of a wireless communications device during registration of the wireless communications device in the private wireless communications system, said method comprising:

a) creating an initial permanent subscriber profile corresponding to said wireless communications device in said second database, said creating including entering a logical unit identity but not said physical identity indicator in said second database;

b) thereafter, during at least the initial registration attempt of said wireless communications device in said private wireless communications system, said wireless communications device sending said physical identity indicator to said private wireless communications system and said private wireless communications system automatically sending a verification inquiry to said public wireless communications system, said verification inquiry including at least said logical unit identity;

c) thereafter, said public wireless communications system sending a verification answer to said private communications system indicating the subscription status of said wireless communications device in response to said verification inquiry; and d) thereafter, said private communications system automatically adding said sent physical identity indicator to said permanent subscriber profile if the verification answer indicates a favorable subscription status.

2. The method of claim 1 wherein the communications between said private communications system and said wireless communications device during said registration attempt conform to those used by said public communications system to register wireless communications devices therein.

3. The method of claim 1 wherein said public wireless communications system operates according to a first protocol and said private wireless communications system operates according to a second protocol.

4. The method of claim 3 wherein said first protocol is ANSI-136.

5. The method of claim 1 wherein said creating an initial permanent user profile includes manual entry of said logical unit identity.

6. The method of claim 1 further including refusing to register said wireless communications device in said private communications system if the verification answer indicates an unfavorable subscription status for said wireless communications device.

7. The method of claim 1 wherein steps b through d are repeated when said wireless communications device subsequently attempts to register with said private communications system.

8. The method of claim 7 wherein steps b through d are repeated for each subsequent attempt by said wireless communications device to register with said private communications system.

9. The method of claim 1 further including entering said logical unit identity and said physical identity indicator corresponding to said wireless communications device in said first database prior to said initial registration attempt of said wireless communications device in said private wireless communications system.

10. The method of claim 9 wherein said verification answer indicates the propriety of the combination of said physical identity indicator and said logical unit identity.

11. The method of claim 1 wherein said verification inquiry includes said physical identity indicator sent by said wireless communications device.

12. The method of claim 1 wherein said wireless communications device sends said logical unit identity and said physical identity indicator to said private wireless communications system in response to a request by said private wireless communications system.

13. The method of claim 1 wherein said private communications system does not store said sent physical identity indicator in said permanent subscriber profile if said verification answer indicates an unfavorable subscription status for said wireless communications device.

14. The method of claim 1 wherein said wireless communications device is a cellular telephone.

15. The method of claim 1 wherein said private communications system adds said sent physical identity indicator to said permanent subscriber profile and continues with normal registration of said wireless communications device if the verification answer indicates a favorable subscription status.

16. The method of claim 1 wherein said physical identity indicator is an ESN.

17. The method of claim 16 wherein said logical unit identity is an MIN.

18. In a wireless communications network having a public wireless communications system including a first database and a private wireless communications system including a second database, a method for the private wireless communications system to automatically obtain the ESN of a wireless communications device during registration of the wireless communications device in the private wireless communications system, said method comprising:

a) entering a MIN and said ESN corresponding to said wireless communications device in said first database;

b) creating an initial permanent subscriber profile corresponding to said wireless communications device in said second database, said creating including entering said MIN but not said ESN in said second database;

c) thereafter, during at least the initial registration attempt of said wireless communications device in said private wireless communications system, said wireless communications device sending its ESN and its MIN to said private wireless communications system and said private wireless communications system automatically sending a verification inquiry to said public wireless communications system, said verification inquiry including at least said sent MIN and said sent ESN; wherein the communications between said private communications system and said wireless communications device during said registration attempt conform to those used by said public communications system to register wireless communications devices therein;

d) thereafter, said public wireless communications system sending a verification answer to said private communications system indicating the subscription status of said wireless communications device in response to said verification inquiry; and e) thereafter:
  i) said private communications system automatically adding said sent ESN to said permanent subscriber profile and continues with normal registration of said wireless communications device if the verification answer indicates a favorable subscription status; and
  ii) said private communications system does not add said sent ESN in said permanent subscriber profile and refuses to register said wireless communications device if the verification answer indicates an unfavorable subscription status for said wireless communications device.

19. The method of claim 18 wherein said public wireless communications system operates according to an ANSI-136 protocol and wherein said public communications system and said private communications system communicate using ANSI-41 over SS7.

20. A wireless communications assembly, comprising:

a) a public wireless communications system operating according to a first protocol;

b) a private wireless communications system operating according to a second protocol;

c) a wireless communications device operative to send and receive signals according to said first protocol in a first mode and said second protocol in a second mode; said wireless communications device having a MIN and an ESN associated therewith;

d) said public wireless communications system including a first database having stored therein said MIN and said ESN associated with said wireless communications device;

e) said private wireless communications system including a second database having therein a subscriber profile associated with said wireless communications device, said subscriber initially including said MIN, but not said ESN, associated with said wireless communications device;

f) wherein, during at least the initial registration of said wireless communications device in said private wireless communications system, said private wireless communications system requests said wireless communications device to send its ESN and wherein said private wireless communications system automatically forwards said sent ESN and the corresponding MIN to said public wireless communications system as part of a verification inquiry;

g) wherein said public wireless communications system thereafter sends a verification answer to said private communications system indicating the subscription status of said wireless communications device in response to said verification inquiry; and h) wherein said private communications system thereafter automatically adds said sent ESN to said permanent subscriber profile if the verification answer indicates a favorable subscription status.

21. The wireless communications assembly of claim 20 wherein the communications between said private communications system and said wireless communications device during said registration attempt conform to those used by said public communications system to register wireless communications devices therein.

22. The wireless communications assembly of claim 21 wherein said first protocol is ANSI-136.

* * * * *